A. BARNES.
Assignor of one-half Interest to M. BARNES.
CORN PLANTER.
No. 7,522. Reissued Feb. 20, 1877.
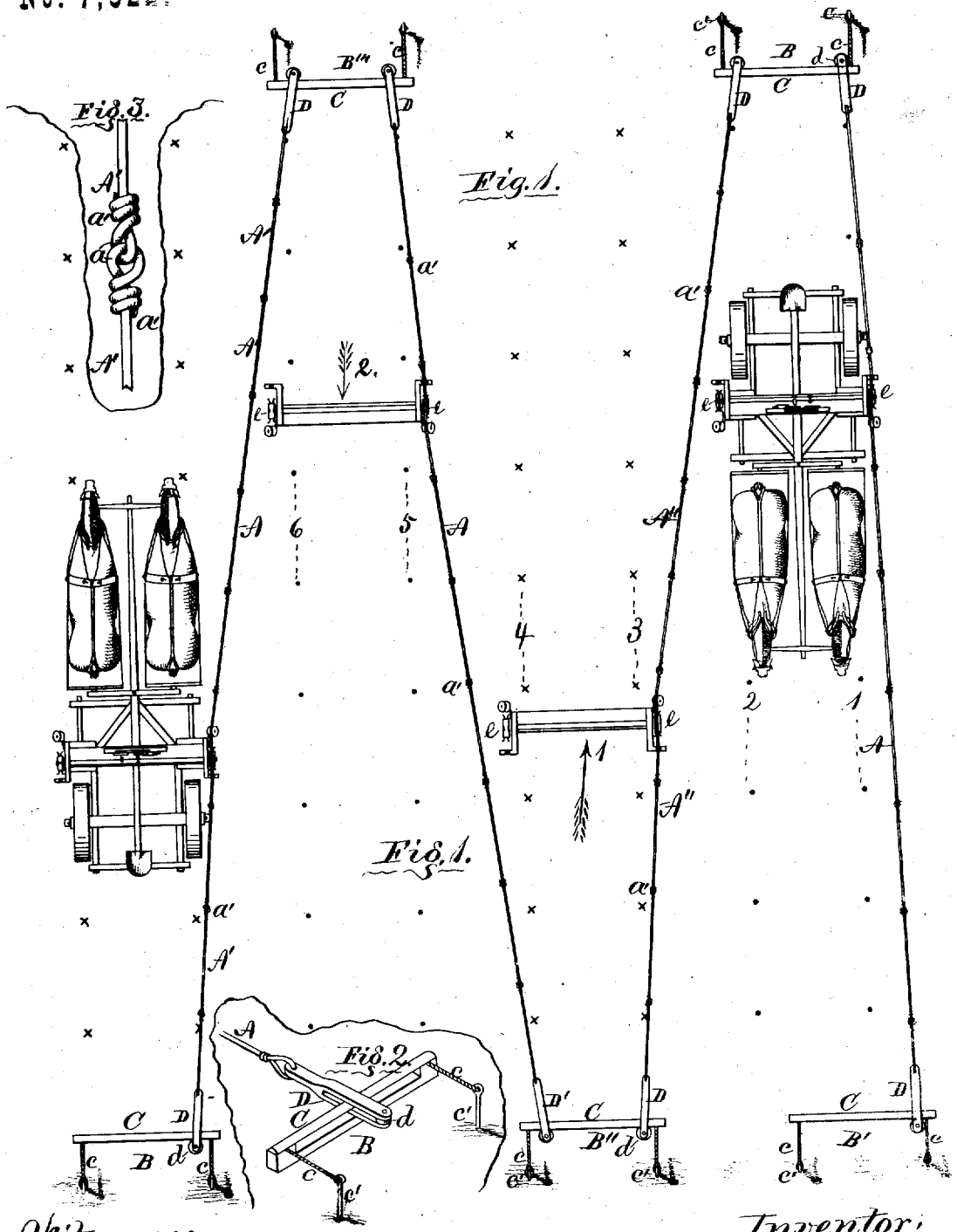
Witnesses:
P. R. Richards.
Chas. Gilpson
Inventor:
Aldes Barnes
By W. B. Richards,
Atty.

UNITED STATES PATENT OFFICE.

ALDEN BARNES, OF BLOOMINGTON, ILLINOIS, ASSIGNOR OF ONE-HALF INTEREST TO MONROE BARNES.

IMPROVEMENT IN CORN-PLANTERS.

Specification forming part of Letters Patent No. 132,792, dated November 5, 1872; reissue No. 7,522, dated February 20, 1877; application filed January 16, 1877.

DIVISION B.

*To all whom it may concern:*

Be it known that I, ALDEN BARNES, of Bloomington, in the county of McLean and State of Illinois, have invented certain new and useful improvements in check-row actuating devices for corn-planters, and anchors for securing the same in place in the field, which improvements are fully set forth in the following specification and accompanying drawing, in which—

Figure 1 is a diagram, top view, showing the manner of using my improved anchor. Fig. 2 is a perspective view of the anchor and one end of the check-row chain; and Fig. 3 is a perspective view, showing the mode of uniting the sections of the check-row chain.

My invention relates to improvements in the construction of the knotted check-row chain used for actuating the seeding mechanism of corn-planters, and to improvements in the anchor or devices for securing the ends of the check-row chain in position on the field; and the invention consists in making said actuating-chain in sections of uniform length, united together in such manner as to form knots or enlargements without additional materials, the length of the sections corresponding with the distance between the rows to be planted, and the enlargements or knots actuating the forked levers of the check-row attachment to corn-planters, as hereinafter more fully set forth.

It also consists in the use of a bar-anchor, to which the end of the knotted check-row device may be attached, so that it can move laterally thereon as the planter passes across the field; and it further consists in the details of construction of said bar and anchor, and device for attaching the check-row device thereto, and their arrangement, as hereinafter described and claimed.

The same letter indicates the same part in the different views in the drawing.

My improved chain A is formed of a series of links, A′, of uniform length, each link of a length corresponding with the distance which it is desired to have the transverse rows apart. The links A′ are united to each other by bending or curving their ends, so as to form interlocking eyes *a*. The eyes *a* are of such distance from the ends of the links on which they are formed as to leave a portion or end which may be wound or curved around the body of the link close to the eye, to form an enlargement, knot, or trippet, *a′*, at the union of the links to each other, as shown at Fig. 3, for actuating check-row corn-planters through periodical contact with forked levers or tappets, and discharging a measured quantity of seed at each impulse given to the seed-dropping mechanism by contact of the forked levers with the regularly-recurring knots *a′*. B represents an anchor for securing the ends of check-row chain adjacent to the ends of the rows being planted. C is a double bar, having short cords or chains *c* and stakes *c′*, by which, or by other suitable means, it may be staked to the ground where desired. The bar C should preferably be of a length about equal to the distance between two rows of seed to be planted. D is a forked bar, its forked end passed over the upper limb of the bar C, and a pulley, *d*, journaled in its outer forked end, serves as an anti friction roll when the bar traverses the bar C from end to end, as hereinafter described. The two ends of the knotted actuating device are secured each to one end of a bar, D.

For operation in the field, an anchor, B, is secured at each end of the first two rows to be planted, as shown by B B′ at the right-hand side of Fig. 1, and the chain placed in its first position; A is then placed on the forked levers *e* at the left-hand side of the planter E, which is then drawn across the field in the direction indicated by the attached horses, planting the rows 1 and 2. The end of the row being arrived at, the anchor B′ is moved to its second position, B″, and the planter E returned in the direction shown by the arrow 1, planting in its passage the rows 3 and 4, the chain being in its second position, A″, and in contact with the forked levers at right-hand side of the planter. The first end being returned to the anchor, B is moved to its second position, B‴, and the planter E turned round and placed with its left-hand side in contact with the chain. As the planter is now drawn forward in the direction shown by arrow 2, to plant the rows 5 and 6, it will cause the bar D to traverse the bar C at the second position, B″, of the anchor, and assume the position shown by the second bar D′, thus allowing the check-row chain to be brought nearer into line with the rows to be planted than can be done by an anchor which does not permit of lateral movement of the attached end of the chain A. The left-hand side of Fig. 1 illustrates the further and continued operation of the chain, anchor, and planter.

The bar D being connected to the upper limb of the bar C, the lower limb will rest on the surface of the ground, and allow the bar D to traverse the bar C without interruption from friction of the surface of the ground.

Having described my invention, what I claim as new, and desire to secure by Letters Patent, is—

1. In combination with a corn-planter, a check-row chain having knots *a′* formed by coiling a portion of wire around the main wire, substantially as described, and for the purpose specified.

2. In combination with a corn-planter check-row chain, and with the field-anchor, a traversing bar, D, for connecting the check-row chain to the anchor, so that it may have lateral movement, substantially as described, and for the purpose specified.

3. The bar C, having an upper and lower limb, arranged to operate with the bar D and check-row chain A, substantially as described, and for the purpose specified.

4. The bar C, staked to the ground, substantially as described, and arranged to operate with the bar D, pulley *d*, and check-row chain A, substantially as and for the purpose specified.

In testimony that I claim the foregoing I have hereunto affixed my signature this 4th day of January, 1877, in presence of two witnesses.

ALDEN BARNES.

Witnesses:
E. H. SHORES,
JAS. R. BROOKS.